United States Patent [19]
Kusano et al.

[11] 4,005,017
[45] Jan. 25, 1977

[54] CONTACTING APPARATUS

[75] Inventors: Kazuto Kusano; Hiroshi Ando, both of Tokyo; Takashi Kagami, Yokohama; Azusa Uchida, Zushi; Noboru Akiyama, Izumisano; Yoshihiro Ueda; Yoshio Akiba, both of Kasukabe, all of Japan

[73] Assignee: Japan Gasoline Co., Ltd., Tokyo, Japan

[22] Filed: July 25, 1975

[21] Appl. No.: 599,030

Related U.S. Application Data

[63] Continuation of Ser. No. 426,224, Dec. 19, 1973, abandoned.

[30] Foreign Application Priority Data

Dec. 25, 1972    Japan ............................ 47-147704

[52] U.S. Cl. .................................. 210/284; 23/284; 55/387
[51] Int. Cl.² ........................................ B01D 23/10
[58] Field of Search ............. 55/73, 387; 210/228, 210/231, 237, 238, 283, 284, 484, 485; 23/284

[56] References Cited
UNITED STATES PATENTS

| 3,501,897 | 3/1970 | Van Helden et al. ................ 55/73 |
| 3,648,842 | 3/1972 | Zievers ............................. 210/237 |
| 3,755,535 | 8/1973 | Naber ................................. 55/387 |
| 3,770,647 | 11/1973 | Dautzenberg et al. ............... 55/73 |

Primary Examiner—Thomas G. Wyse
Assistant Examiner—Ivars Cintins
Attorney, Agent, or Firm—Woodhams, Blanchard and Flynn

[57] ABSTRACT

An apparatus for facilitating the contact between solid particles and a fluid, which apparatus comprises a multi-layered network structure composed of a plurality of network structures consisting of a plurality of square nets of equal size held at regular intervals by means of spacers extending parallel to the nets separate fluid flow, said spacers concurrently forming plural elongated compartments with rectangular cross-section in conjunction with two adjacent nets, a bottom member placed at the lower ends of said nets alternately between two adjacent nets and edge holders for said nets as fixed parallel to said spacers, a housing to accommodate said multi-layered network structure and solid particles packed in said compartments of alternate layers of the multi-layered network structure; thereby a fluid being passed through fluid flow passages formed as alternate layers between said packed layers contacts solid particles.

6 Claims, 4 Drawing Figures

FIG. 1
FIG. 3
FIG. 4
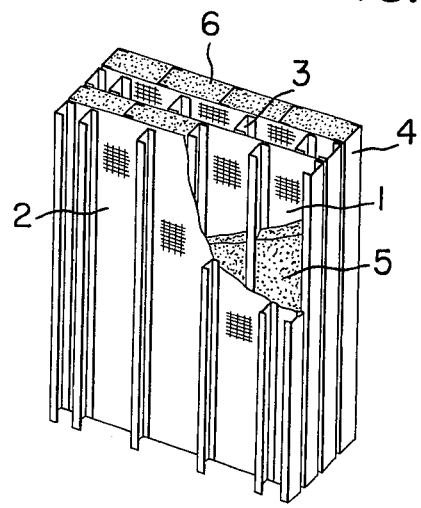
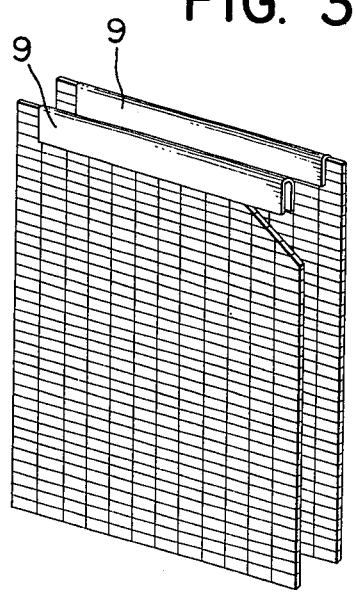
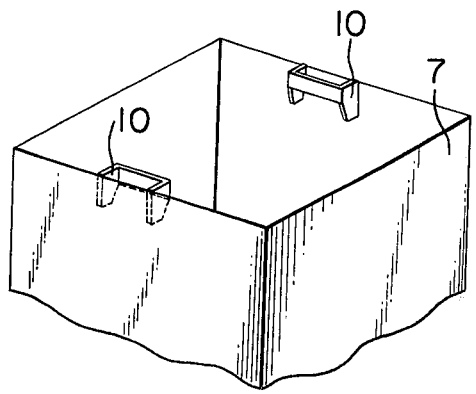

CONTACTING APPARATUS

This is a continuation of application Ser. No. 426,224, filed Dec. 19, 1973, now abandoned.

BACKGROUND OF THE INVENTION a. Field of the Invention

The present invention relates to an apparatus for facilitating the contact between solid particles and a fluid and particularly it relates to an apparatus for flowing a fluid parallel to a layer of packed solid particles which apparatus is suited for the desulfurization and/or removal of nitric oxide treatment of waste gases or the deionization treatment of waste waters.

b. Description of the Prior Art

As a process for bringing solid particles into contact with a fluid, a process of passing the fluid through a packed bed of solid particles has been popular. However, this process is disadvantageous in that, when the amount of the fluid to be treated is relatively large, it not only is attended with such troubles as occurrence of clogging in the packed bed, increase of the pressure drop, requirement for much feed pressure, extraordinary generation of heat and so forth, but also efficient replacement of solid particles is hampered so that it is not always profitable from the industrial point of view.

There is also known a process for flowing the fluid in parallel to a packed layer of solid particles wherein the packed layer of solid particles and the fluid passage layer are disposed alternately and in parallel to each other, as has been disclosed in British Patent Nos. 1,154,008 and 1,210,867. This process for making the fluid pass in parallel to the solid particles-packed layer is admittedly worthy of note as a process for effecting the contact between solid particles and a fluid, but it is not always satisfactory for practical use as there has not yet been developed any suitable apparatus effective and convenient for use in practicing said process industrially.

The reason is that, according to this process, it has so far been difficult to maintain a uniform bulk density of solid particles within the solid particles-packed layer which has an important influence upon the contacting efficiency, and further it has been not easy to perform the work of charging and replacing of the solid particles efficiently.

SUMMARY OF THE INVENTION

One object of the present invention is to provide an apparatus for contacting solid particles with a fluid which renders it possible to practice the foregoing process for making the fluid pass in parallel to a solid particles-packed layer very efficiently from the industrial point of view. Particularly, the present invention is intended to provide an apparatus suited for use in treating a large quantity of waste gases requiring desulfurization and/or removal of nitric oxide and the like when the fluid to be treated is a gaseous mixture or treating waste waters requiring deionization when the fluid to be treated is a liquid.

Another object of the present invention is to provide an apparatus for contacting solid particles with fluid which renders it possible to perform such operations as the renewal, charging, etc. of the solid particles, efficiently.

Still another object of the present invention is to provide an apparatus for contacting solid particles with fluid which has an improved holding strength as well as an enhanced contact area for the fluid and is industrially profitable from the view point of economy in materials, etc.

For the purpose of attaining the foregoing objects, the apparatus under the present invention is constructed as described in the following. That is, the present invention is characterized by an apparatus for contacting solid particles with a fluid which is comprised of a multi-layered network structure composed of a plurality of network structures consisting of a plurality of square nets of equal size held at regular intervals by means of spacers extending parallel to the nets to separate the fluid flow, said spacers concurrently forming with the two adjacent nets plural elongated compartments having a rectangular cross-section, a bottom member placed at the lower ends of said nets alternately between two adjacent nets and edge holders for said nets and fixed parallel to said spacers, a housing for holding said multi-layered network structure and solid particles packed in the compartments of alternate layers of the multi-layered network structure; whereby a fluid passed through the open passages formed as alternate layers between said packed layers will contact said packed solid particles.

In the apparatus of the present invention, the disposition of the nets constituting the network structure is specified, the edge of each net is provided with a reinforcement member, and the location of the spacers within the solid particles-packed layers and the location of the spacers within the fluid passage layers are laterally offset, thereby enhancing the contact efficiency as well as the holding strength of the apparatus, and further said housing of the apparatus is provided with stepped grooves, arms or the like.

BRIEF DESCRIPTION OF THE DRAWINGS

In the appended drawings,

FIG. 1 is a perspective view of a multi-layer network structure according to the present invention.

FIG. 3 is a perspective view showing the edges of nets provided with a reinforcement member.

FIG. 4 is a perspective view of the housing and illustrating the lifting lug.

DETAILED DESCRIPTION OF THE INVENTION

Figure 2:
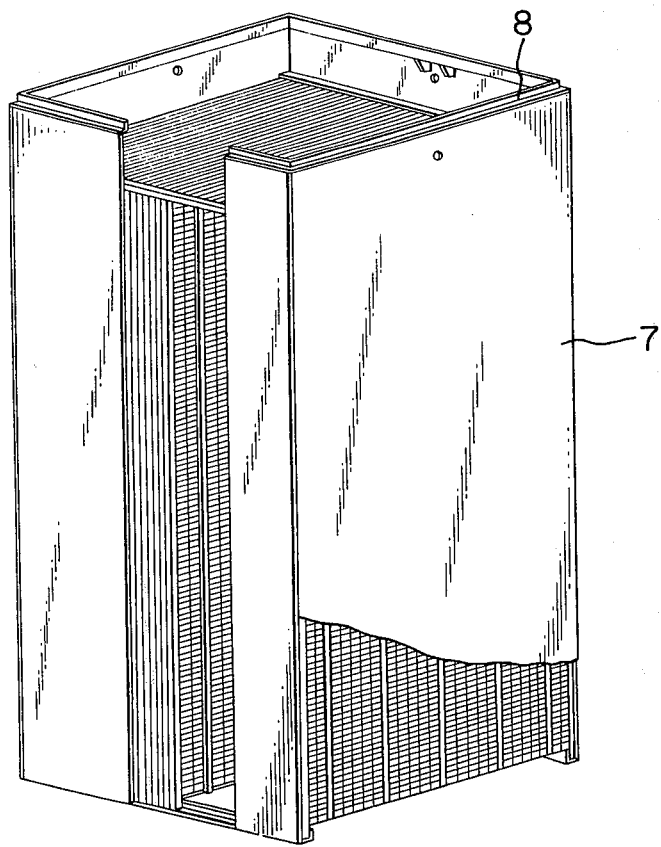
FIG. 2 is a perspective view of an apparatus for contacting solid particles with fluid composed of a multi-layered network structure disposed in a housing.

Referring to FIG. 1, two nets 1, 2 of equal size are held at an appropriate distance by means of a plurality of spacers which extend parallel to the direction of flow of the fluid. These nets 1, 2 are made of metal or synthetic high polymer material, but they are of course required to possess a strength sufficient to effectively hold the solid particles and to have a mesh a size capable of retaining the solid particles between them. The deformation of these nets incident to thermal expansion thereof on the occasion of bringing the solid particles into contact with a high-temperature fluid can be relatively slight when they are disposed so that the direction of longer latus of the mesh openings are perpendicular to the direction of flow of the fluid. Accordingly, in the case of an apparatus for contacting solid particles with fluid wherein the holding of adjacent nets at fixed intervals is apt to affect particularly the contacting efficiency, the disposition of meshes as above is a matter of importance.

The side edges of said network structure parallel to the spacers 3 are fixed by means of edge holders 4, such as channels thereby to form spaces defining a plurality of zones. Solid particles are packed into alternate zones and the remaining zones are free of solid particles to define fluid flow passages extending parallel to the packed layers of solid particles. These spacers 3 hold the adjacent solid particles-packed layer and fluid passage layer at regular intervals without having any bad influence upon the contacting efficiency.

Moreover, the spacers 3, such as channels, are disposed within the solid particles-packed layer and within the fluid passage layer in laterally offset relation which is very advantageous from the view point of the holding strength of net, contact area, economy of materials, etc. Bottom members are alternately placed between two adjacent nets at the lower ends thereof. The network structure according to the present invention may be a multi-layer network structure formed by joining a plurality of unit structure, said unit structure being composed of two square nets held at fixed intervals by means of spacers disposed therebetween and the outer side of one net being further provided with spacers disposed laterally relative to offset the spacers interposed between the two nets.

As shown in FIG. 2, the multi-layered network structure is disposed in a housing by arranging a plurality of such network structures therein so that they extend parallel to the direction of flow of fluid. In this multi-layered network structure disposed in a housing, the solid particles are packed in alternate layers. The fluid flows from the lower end to the upper end or from the upper end to the lower end of the housing through the fluid passage layers formed alternately with the solid particles passage layers so that fluid comes into contact with the solid particles, whereby the desired result is attained.

The housing 7 for holding the multi-layered network structure is capable of accommodating said structure, and it is immaterial whether it is box-shaped or cylinder-shaped.

As the solid particles 5 are to be packed through the open upper end of the network structure, application of a reinforcement member 9, such as U-shaped rim, to the edge 6 of each net at the opening of the network structure as shown in FIG. 3 is effective for strengthening of the edge 6.

Further, to provide for employing plural housings 7 mounted one on top of the other, the upper edge and the lower edge of the housing are provided with stepped grooves 8 so as to provide means for coupling one housing with another. Therefore, when the solid particles are to be replaced, the housing 7 is usually taken as a unit of replacement, and accordingly, for the purpose of facilitating such operations as hoisting of the housing 7, it is convenient to equip lifting lugs 10 on the housing 7 as shown in FIG. 4. At the time of replacing the solid particles, the used solid particles can be simply discharged by hoisting the housing 7, turning it upside down and then removing the cover employed for preventing the solid particles from being scattered. At the time of charging new solid particles, on the other hand, it is possible to obtain a satisfactorily uniform bulk density of packed solid particles by placing the housing 7 on a vibrator and dropping the solid particles into it from above.

What is claimed is:

1. An apparatus for contacting a fluid with a solid, comprising:
    an elongated upright housing which is open at its opposite longitudinal ends so that a fluid can be flowed into one end thereof and discharged from the opposite end thereof;
    a multi-layer network structure disposed in said housing and defining a plurality of upright, parallel, spaced-apart zones filled with solid particles, said network structure also defining a plurality of upright, parallel, spaced-apart, fluid flow passages respectively disposed between each pair of adjacent zones, said network structure consisting of a plurality of like units disposed in side-by-side relation, each of said units consisting of
    1. a pair of upright, spaced-apart, rectangular, flat, fluid-permeable nets of the same size disposed in parallel to each other, extending longitudinally in said housing and defining a single zone,
    2. a plurality of upright, parallel, substantially uniformly laterally spaced-apart, elongated inner spacers disposed between the lateral ends of said nets and extending from one longitudinal end to the other longitudinal end thereof, said inner spacers contacting the opposing surfaces of said pair of nets and dividing the zone between said pair of nets into a plurality of compartments which are substantially rectangular in cross-section,
    3. a bottom wall extending between the lower ends of said pair of nets for retaining said solid particles in said compartments,
    4. side walls at the lateral ends of said pair of nets for closing the lateral ends of said zone,
    5. a plurality of upright, parallel, substantially uniformly laterally spaced-apart, elongated, outer spacers attached to the outer surface of one of said pair of nets, said outer spacers being located between the lateral ends of said one net and extending between and contacting said outer surface of said one net of one unit and the outer surface of a net of the adjacent unit defining the opposite side of the adjacent zone, said outer spacers extending parallel to said inner spacers and extending from one longitudinal end to the other longitudinal end of said nets, said outer spacers dividing the space between two adjacent zones into a plurality of fluid flow passage sections which are substantially rectangular in cross-section, said outer spacers being disposed laterally offset from and located approximately midway between and spaced from adjacent inner spacers with said one net being exposed between adjacent inner and outer spacers so that each flow passage section overlaps and communicates through said one net with two of said compartments and vice versa,
    6. further side walls at the lateral ends of the space between two adjacent zones for closing the lateral ends of said fluid flow passages, said fluid flow passages being open at the upper and lower ends thereof, whereby the fluid flows longitudinally through said sections and is adapted to contact the solid particles in said compartments.

2. An apparatus according to claim 1 wherein said nets are screens having longitudinally and laterally extending spaced-apart wires crossing each other at right angles and the distance between each pair of adjacent longitudinally extending wires is longer than the distance between each pair of adjacent laterally extending wires.

3. An apparatus according to claim 1, wherein the upper ends of said compartments are open.

4. An apparatus according to claim 3 wherein the upper edges of said nets have mounted thereon a reinforcing rim having an inverted U-shape, in cross section.

5. An apparatus according to claim 1 wherein said inner spacers and said outer spacers each is channel-shaped in cross-section and consists of a pair of parallel legs connected by a transverse connecting web, said connecting web extending substantially perpendicular to the adjacent nets and said legs extending parallel to and contacting the surfaces of the adjacent nets.

6. An apparatus according to claim 5 wherein said side walls also are channel-shaped in cross-section with their transverse legs extending parallel to and contacting the surfaces of the adjacent nets.

* * * * *